(12) United States Patent
Metts

(10) Patent No.: US 11,074,825 B2
(45) Date of Patent: Jul. 27, 2021

(54) AUTOMATED REMOTE LEARNING DEVICE AND SYSTEM FOR USING SAME

(71) Applicant: University of South Carolina, Columbia, SC (US)

(72) Inventor: David M. Metts, Columbia, SC (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 16/829,091

(22) Filed: Mar. 25, 2020

(65) Prior Publication Data

US 2020/0226943 A1 Jul. 16, 2020

Related U.S. Application Data

(63) Continuation of application No. 15/603,524, filed on May 24, 2017, now Pat. No. 10,636,317.

(60) Provisional application No. 62/341,662, filed on May 26, 2016.

(51) Int. Cl.
*G09B 5/12* (2006.01)
*G09B 5/14* (2006.01)
*G09B 5/06* (2006.01)
*G09B 23/18* (2006.01)
*G09B 19/00* (2006.01)

(52) U.S. Cl.
CPC .............. *G09B 5/125* (2013.01); *G09B 5/065* (2013.01); *G09B 5/14* (2013.01); *G09B 19/0069* (2013.01); *G09B 23/185* (2013.01)

(58) Field of Classification Search
CPC . G06F 17/5068; G09B 19/0069; G09B 5/065; G09B 5/125
See application file for complete search history.

(56) References Cited

U.S. PATENT DOCUMENTS

| | | | |
|---|---|---|---|
| 6,021,720 A | 2/2000 | Boos | |
| 10,636,317 B2* | 4/2020 | Metts | ............... G09B 5/125 |
| 2006/0092268 A1 | 5/2006 | Ahn et al. | |
| 2007/0291466 A1 | 12/2007 | Krestakos et al. | |
| 2013/0100025 A1 | 4/2013 | Vernacchia | |
| 2014/0130002 A1 | 5/2014 | AbdelAzim et al. | |

* cited by examiner

*Primary Examiner* — Jerry-Daryl Fletcher
(74) *Attorney, Agent, or Firm* — Burr & Forman LLP; Douglas L. Lineberry

(57) ABSTRACT

A distance learning device for providing laboratory instruction via two-way interaction with a student at a remote location and system for using same.

16 Claims, 13 Drawing Sheets

Voltage Measurements depicted as v1, v2, AND v3

AUTOMATED REMOTE LEARNING DEVICE AND SYSTEM FOR USING SAME

BACKGROUND OF THE INVENTION

1) Field of the Invention

The present invention relates to a distance learning device for providing laboratory instruction via two-way interaction with a student at a remote location and system for using same.

2) Description of Related Art

Distance education, or distance learning, is the education of students who are not physically present at a university or educational center. This type of educational situation is also referred to as distributed learning, e-learning, online learning, etc. The widespread use of computers and the Internet have made distance learning economical, as well as easier and faster. Currently, virtual schools and universities deliver full curricula online. The capacity of the Internet to support voice, video, text and immersion teaching methods made earlier distinct forms of telephone, videoconferencing, radio, television, and text based education somewhat redundant. However, many of the techniques developed and lessons learned with earlier media are used in Internet delivery.

The first fully online university was founded in 1994 as the Open University of Catalonia, headquartered in Barcelona, Spain. In 1999, Jones International University was launched by Glenn Jones, CEO and Bernard Luskin, Chancellor as the first fully online university accredited by a regional accrediting association in the US.

Between 2000 and 2008, enrollment in distance education courses increased rapidly in almost every country, both developed and developing. Many private, public, non-profit and for-profit institutions worldwide now offer distance education courses from the most basic instruction through to the highest levels of degree and doctoral programs. New York University, for example, offers online degrees in engineering and management-related fields through NYU Tandon Online. Levels of accreditation vary: widely respected universities such as Stanford University and Harvard now deliver online courses—but other online schools receive little outside oversight, and some are actually fraudulent, i.e., diploma mills. In the US, the Distance Education Accrediting Commission (DEAC) specializes in the accreditation of distance education institutions.

Distance education has a long history, but its popularity and use has grown exponentially as more advanced technology has become available. By 2008, online learning programs were available in the United States in 44 states at the K-12 level. Internet forums, online discussion group and online learning community can contribute to an efficacious distance education experience. Research shows that socialization plays an important role in some forms of distance education.

By 2011, a third of all U.S. students enrolled in postsecondary education had taken an accredited online course at a postsecondary institution. Even though growth rates are slowing, enrollment for online courses has been seen to increase with advances in technology. The majority of public and private colleges now offer full academic programs online. These include, but are not limited to, training programs in the mental health, occupational therapy, family therapy, art therapy, physical therapy, and rehabilitation counseling fields. Even engineering courses that require the manipulation and control of machines and robots that are technically more challenging to learn remotely are subject to distance learning through the internet.

Interactive Distance Learning (IDL) is a proven training method that uses interactive technologies to allow instructors and students to communicate from geographically dispersed locations. Instruction can be transmitted through a business television network, point-to-point videoconferencing networks, or over the Internet or intranets. IDL allows one instructor to transmit to and to train a potentially unlimited audience. Plus, it provides a means for immediately ascertaining audience comprehension and tracking overall training results. The classic IDL model is the transmission of training over these networks in an essentially broadcast-type manner, with feedback permitted back to the instructor.

However, one drawback with distance learning programs is how to effectively administer "hands on" lab activities in educational fields that require laboratory time in order to understand the subject matter. Students at remote sites are typically not able to train in a real-time environment using specialized, expensive apparatus as transporting the specialized, expensive equipment or apparatus to the remote site for real-time environment training is cost prohibitive.

What is needed in the art is a way of enabling distance learning between a student(s) and teacher that provides a way for the student(s) to conduct experiments, with the professor actively observing and providing guidance as needed. Further, the current disclosure seeks to improve student retention in online courses by revolutionizing the online course environment via improved interaction.

SUMMARY OF THE INVENTION

In one embodiment, a distance learning device is provided. The device includes a containment shell, a workstation, a two-way communication system, a visual analyzer; and a remote controlled indicator capable of interacting with a surface of the workstation. In a further embodiment, the device includes an articulation arm. In another embodiment, the device includes laboratory equipment. Still further, the laboratory equipment includes an electronic breadboard. In a yet other embodiment, the device is configured to communicate with other distance learning devices. In another embodiment, the device is configured to provide two-way video and audio communication. Still further, the device includes a video analyzer that comprises an infrared camera. In a yet further embodiment, remote controlled interaction with the workstation is achieved without requiring physical proximity to the device.

In an alternative embodiment, a system is provided for conducting distance learning laboratories. The system includes providing a portable distance learning device, wherein the device contains at least two-way audio and visual communication, interacting with a workstation on the device via a remote controlled indicator, and interacting via the portable distance learning device to provide laboratory instruction. In a further embodiment, the system includes an articulation arm. In another embodiment, the workstation includes laboratory equipment. Still further, the laboratory equipment includes an electronic breadboard. In a further embodiment, the portable distance learning device is configured to communicate with other portable distance learning devices. Still further yet, the portable distance learning device is configured to provide two-way video and audio communication. In a yet further embodiment, the system includes an infrared camera. Still further, remote controlled interaction with the workstation is achieved without requiring physical proximity to the device.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

Figure 1A:
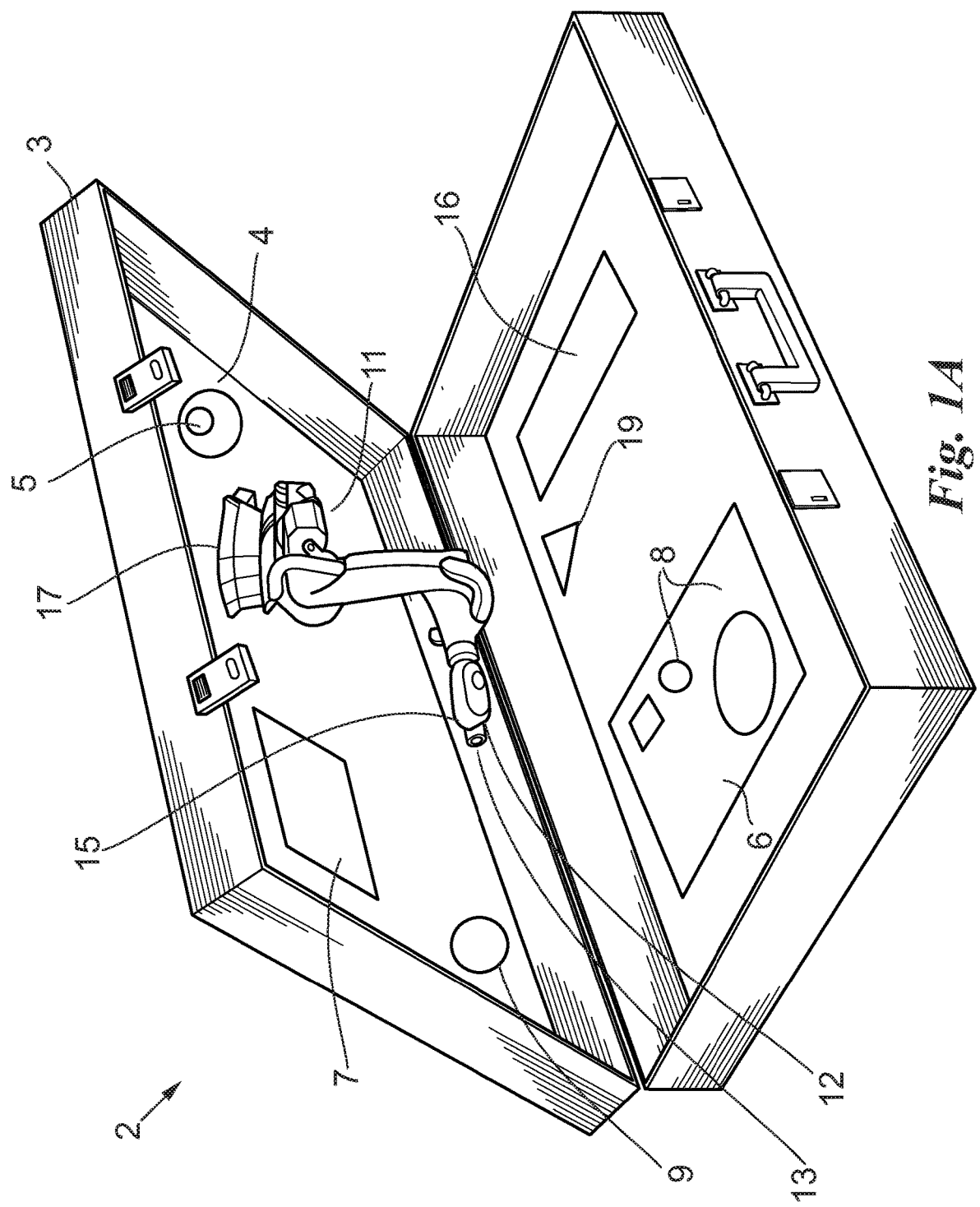
FIG. 1A shows one embodiment of a distance learning device of the current disclosure.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

In one embodiment, the current disclosure is directed to a distance learning system for allowing a student or trainee and an instructor or professor to actively interact with one another to conduct lab environment type classes. For instance, in a preferred embodiment, a student or trainee could work with a professor or instructor to conduct a laboratory directed to building electronic circuits. The current disclosure is applicable to any laboratory educational events wherein an instructor would observe status, conditions, or procedure and interpret the status, conditions, or procedure so as to direct or redirect a student(s) to learn, comprehend or make corrections to a procedure to achieve objectives or obtain desired results. For example: a slight modification may occur so as to include sensors, transducers or instrumentation to be interfaced into a breadboard. Analog tap voltages would represent scaled values for physical variables such as temperature, pressure, flow, level, position, velocity, acceleration, analytical, etc.

FIG. 1A shows one embodiment of the current disclosure. In this embodiment, the automated remote learning device 2 has a containment shell 3, which may be in the form of a briefcase or other portable container, that the student may move from location to location. the system offers the convenience of the student being able to conduct laboratory type learning experiences at any location where two-way communication between the student and instructor may be maintained, such as over Wi-Fi, Internet, or other media or carriers as known to those of skill in the art. In one embodiment, a computer network may be used to have two-way communication by having computers exchange data. This may be accomplished via wired interconnects and/or wireless interconnects. Types of wired interconnects are Ethernets and fiber optic cables. Ethernets connect local devices through Ethernet cables. Fiber runs underground for long distances and is the main source of Internet in most homes and businesses. Types of wireless interconnects include Wi-Fi and Bluetooth. The problem with these networks is that they don't have unlimited connection span. To expand the reach there are wide area interconnects such as satellite and cellular networks. Also, there are long distance interconnects which need backhaul to move the data back and forth and last mile to connect the provider to the network. Remote learning device 2 includes a video analyzer 4, which may be a camera, video monitor, or other device as known to those of skill in the art, that allows the instructor to see workstation 6, upon which the student will conduct experiments. Indeed, video analyzer may be as simple as a two way security camera that allows the instructor to communicate with the student from a remote location.

Workstation 6 may be a multifunctional surface such as a breadboard for electronic laboratory operations. A breadboard In other embodiments, workstation 6 may contain chemical ingredients for chemistry laboratories, or may be a visual interface for students learning a language. In a further embodiment, workstation 6 may include portable laboratory equipment, such as a spectrophotometer, necessary labware, and reagents for different chemical parameters. For biological laboratories, workstation 6 might include a portable incubator and labware to test for parameters such as chlorine (free and total), coliform (total, *E. coli* and fecal), nitrate, nitrite, nitrogen, ammonia, pH, phosphorus, sulfide, TDS, conductivity and turbidity. Other instruments that may be included are, but are not limited to, a turbidity meter, colorimeter and UV lamp.

In one embodiment, workstation 6 may be a breadboard for configuring electrical circuits. Breadboards are one of the most fundamental pieces of equipment when learning how to build circuits. Many years ago, when electronics were big and bulky, users would employ a breadboard, a few nails or thumbtacks, and start connecting wires onto the board to give themselves a platform on which to build circuits. An electronics breadboard (as opposed to the type on which sandwiches are made) is actually referring to a solderless breadboard. These are great units for making temporary circuits and prototyping, and they require absolutely no soldering. For those new to electronics and circuits, breadboards are often the best place to start. They can house both the simplest circuit as well as very complex circuits. Another common use of breadboards is testing out new parts, such as Integrated circuits (ICs). When one is trying to figure out how a part works and constantly rewiring, a user would not want to solder connections each time. If one is not sure how a circuit will react under a given set of parameters, it is best to build a prototype and test it out. Prototyping is the process of testing out an idea by creating a preliminary model from which other forms are developed or copied, and it is one of the most common uses for breadboards.

Figure 1B:
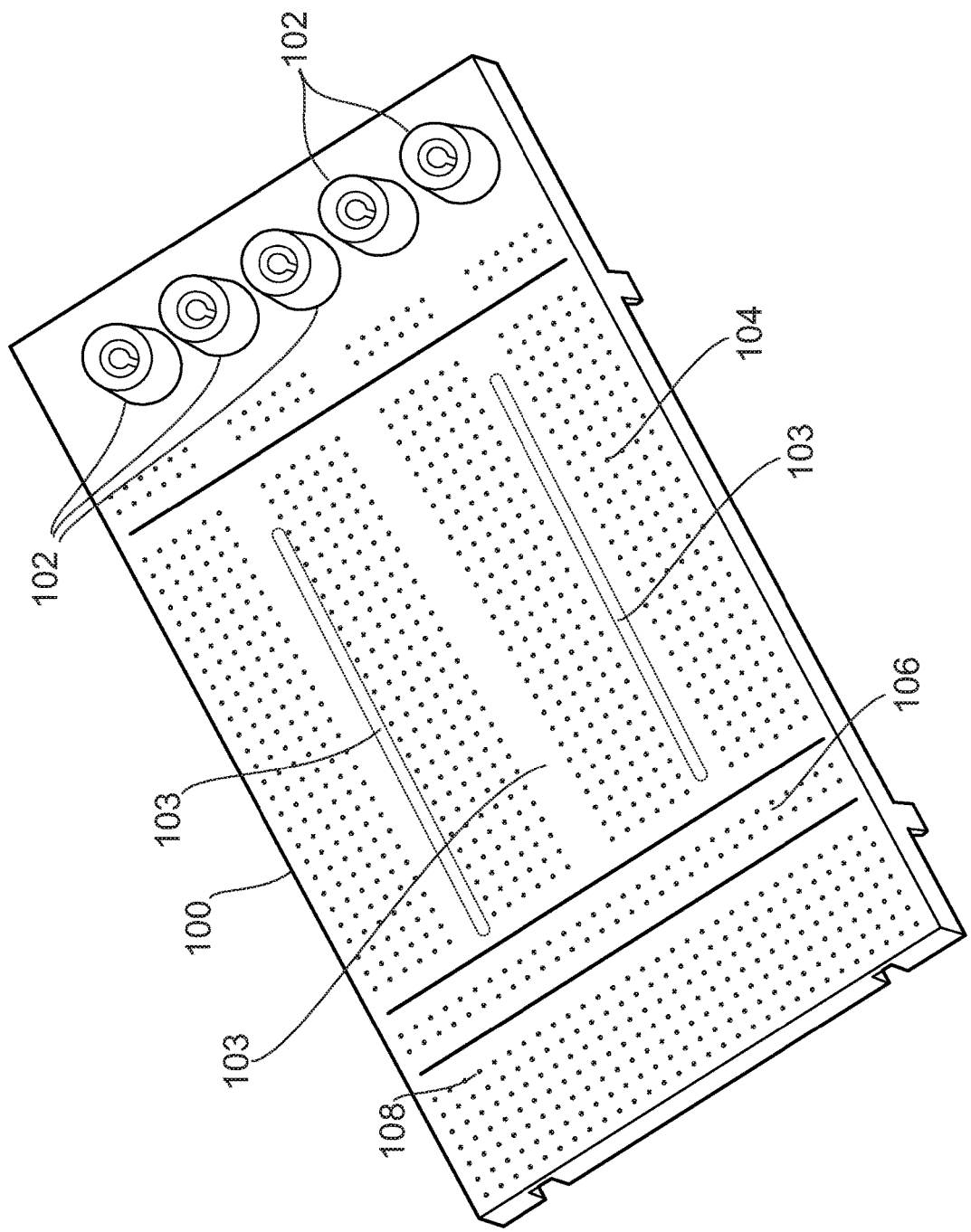
FIG. 1B shows a photograph of one embodiment of a breadboard 100 that may be included in device 2, which may include binding posts 102, DIP support 104, terminal strips 106 and power rails 108.

FIG. 1B shows a photograph of one embodiment of a breadboard 100 that may be included in device 2, which may include binding posts 102, DIP support 104, terminal strips 106 and power rails 108.

Terminal Strips 106 comprise rows of metal strips on the bottom of the breadboard. The tops of the metal rows have clips that hide under the plastic holes. These clips allow one to stick a wire or the leg of a component into the exposed holes on a breadboard, which then hold it in place. Once inserted, that component will be electrically connected to anything else placed in that row. This is because the metal rows are conductive and allow current to flow from any point in that strip. Each horizontal row is separated by a ravine 103, or crevasse, in the middle of the breadboard. Ravines 103 isolate both sides of a given row from one another, and they are not electrically connected. Each side of a given row is disconnected from the other, leaving the user with five spots for components on either side.

Power rails 108 typically run vertically along the sides of breadboard 100. Power rails 108 may be metal strips that are identical to the ones that run horizontally, except they are, typically, all connected. When building a circuit, one tends to need power in lots of different places. The power rails provide easy access to power wherever it is needed in the circuit. Usually power rails 108 will be labeled with a '+' and a '−' and have a red and blue or black stripe, to indicate the positive and negative side.

Ravine 103 that isolates the two sides of a breadboard serves a very important purpose. Many integrated circuits, often referred to as ICs or, simply, chips, are manufactured specifically to fit onto breadboards. In order to minimize the amount of space they take up on the breadboard, they come in what is known as a Dual in-line Package, or DIP 104. DIP chips have legs that come out of both sides and fit perfectly over ravine 103. Since each leg on the IC is unique, one does not want both sides to be connected to each other. That is where the separation in the middle of the board comes in handy. Thus, one can connect components to each side of the IC without interfering with the functionality of the leg on the opposite side.

Many breadboards have numbers and letters marked on various rows and columns. These serve to help guide users building circuits. Circuits can get complicated quickly, and all it takes is one misplaced leg of a component to make the entire circuit malfunction or not work at all. If one knows the row number of the connection, it makes it much simpler to plug a wire into that number rather than eyeballing it.

Some breadboards come on a platform that may have binding posts 102 attached. These posts allow one to connect various, different power sources to breadboard 100. When it comes to providing power to breadboard 100, there are numerous options. If one is working with a development board such as an Arduino, then one can simply pull power from the Arduino's female headers. The Arduino has multiple power and ground pins that one can connect to the power rails or other rows on a breadboard. Connecting the Ground (GND) pin from an Arduino to a row on a mini breadboard. Now any leg or wire connected to that row will also be connected to Ground. The Arduino usually gets its power from the USB port on a computer or an external power supply such as a battery pack or a wall wart. The first step to using binding posts 102 is to connect them to the breadboard using jumper wires. Although it would seem that binding posts 102 are connected to the breadboard, they are not. If they were, one would be limited to where one could and could not provide power. Breadboard 100 is meant to be totally customizable to provide a wide swath of teaching possibilities. It makes sense that binding posts 102 are no different. Typically, one only needs to connect a power and ground wire from the binding posts 102 to breadboard 100. If one need an alternate power source, you can use another binding post 102.

Different methods may be used to connect power to binding posts 102, and, thus, to breadboard 100. Many electronics labs have benchtop power supplies that allow one to provide a wide range of voltage and current to a prototype circuit. Using a banana connector, not shown, one could provide power from the supply to binding posts 102. Alternatively, one could use alligator clips, IC hooks, or any other cables with a banana connection to hook breadboard 100 to a number of different power supplies. Alternatively, a student may pull power directly from a computer via USB connections.

Workstation 6 may include notifiers 8, such as for purposes of example only, analog and digital taps, that would allow the professor to see how the student is progressing with the lab instruction. Other types of communication that may be integrated with workstation 6 include texting and video display abilities, such as via a display view screen 7, as known to those of skill in the art. For purposes of example only, written instructions and the ability to display graphics to communicate electronic schematics as hand-drawn sketches via view screen 7 would aid with real-time directions and instruction. Additionally, workstation 6 may be able to display simulations and provide auto prompts for achievement recognition to students, as known to those of skill in the art, via view screen 7 and/or speaker 9

Video analyzer 4 may also incorporate an infrared camera 5 for determining and locating hot spots or heat plumes on workstation 6. The instructor at a distance could readily use the indication of a hot spot or heat plume information as a pivotal moment to further guide the student. In one embodiment for electronic laboratory embodiments, video analyzer 4 would have infrared capability to see hot spots on the breadboard; helping the instructor to better "see" what the student was doing on the breadboard via the heat emissions produced by the assembled circuitry on the board. This would be a significant improvement over in-class instruction as an instructor would be incapable of seeing these heat blooms with the naked eye.

Further, device 2 may include an articulation arm 11. Incorporation of articulation arm 11 may provide multidimensional interaction between instructor and student over a distance. Articulator arm 11 could be termed a "robot arm" by most modern definitions and could employ robotic arms as known to those of skill in the art. Articulator arm 11 may be capable of full rotational movement as well as movement in the X, Y, and Z planes with respect to attachment point 17. In one embodiment, video analyzer 4 may be affixed to articulator arm 11. In a further embodiment, a second video analyzer 13 may be affixed to proximal end 15 of articular arm 11. In a further embodiment, multiple articulator arms 11 may be housed in one automated remote learning device 2. In this way, articulator arms 11 may interact with one another to demonstrate techniques, such as knot tying, proper handling of a test tube, how to clean a spark plug, how to prepare a culinary dish, demonstrating how to agitate a sample, etc.

Video analyzer 4 may in one embodiment comprise a two-way camera, that, in association with view screen 7, allows the student to also see the instructor. Device 2 also includes an indicator 12. Indicator 12 will enable the professor to direct the student's attention to portions of workstation 6. Indicator 12 would need to be a device capable of pointing to or indicating portions of workstation 6, such as a light, pointer, or laser. In one embodiment, indicator 12 may be a laser pointer mounted on articulator arm 11, which allows the professor to have remote control of the position of the laser pointer and to direct the student's attention to various sites on workstation 6 by pointing to particular parts thereof.

Indicator 12 in conjunction with video analyzer 4 would allow the professor to follow the student's progress, as well as instruct the student on how to make changes to workstation 6, if correction of the lab exercise is needed. Further, device 2 may include a two way communication platform 16. Two way communication platform 16 may include audio and/or visual two way communication as known to those of skill in the art. In a further embodiment, two way communication platform 16 may be integrated with video analyzer 4. In one embodiment, two way communication platform 16 may be capable of communication via a software application such as Skype®, Google Hangouts®, VoIP® call, VSee®, UberConference®, GoToMeeting®, Webex®, Voca®, Viber®, oovoo®, etc., as known to those of skill in the art. At essence, communication may be accomplished via software that requires no more than an internal or external camera and microphone, which may be built into device 2 and an active Internet connection. An internet connection may be established via a modem/router 19, as known to those of skill in the art.

Further, processor 21, software 23, and memory 25 may be incorporated into device 2 in order to provide instructions to a student via forums such as PowerPoint, screen shot captures, or to simply deliver content from the instructor. In one embodiment, a Raspberry PI®, which uses LINUX® or Windows® based operating systems, or others as known to those of skill in the art, may be used with Python Language® software. Further, a 120 GB memory could be employed. The Raspberry PI® board may host 120 GPIO pins, an HDMI port, a USB port, two camera ports, a SD connector and two display ports. Python software language may be used to generate code and subroutines while using an open source, or proprietary, library calls to facilitate video streaming, remote control, GPIO and hypertext interface. In addition, two way communication platform 16 may have audio/video recording capabilities, as known to those of skill in the art, in order to allow a student or instructor to capture activity occurring within a device 2 and create a data cache 27 for later playback, manipulation, discussion, etc., of the captured information. Two way communication platform 16 may also use processor 21, software 23, and memory 25 to enable language translation to overcome communication difficulties between speakers of different languages.

A router may connect multiple networks and may route network traffic between them. The router may have one connection to the Internet and one connection to a private local network, such as device 2. In addition, the router may contain built-in switches that allow for connection of multiple wired devices. The router may also contain a wireless radios for connection with Wi-Fi devices. The modem may serve as a bridge between the local network, such as device 2, and the Internet. Historically, the term "modem" is shorthand for modulator-demodulator. The modem connection to device 2 may depend on the type of connection. The modem may plug into whatever type of infrastructure you have—cable, telephone, satellite, or fiber—and gives a standard Ethernet cable output that can plug into any router (or a single computer) and obtain an Internet connection.

Figure 2:
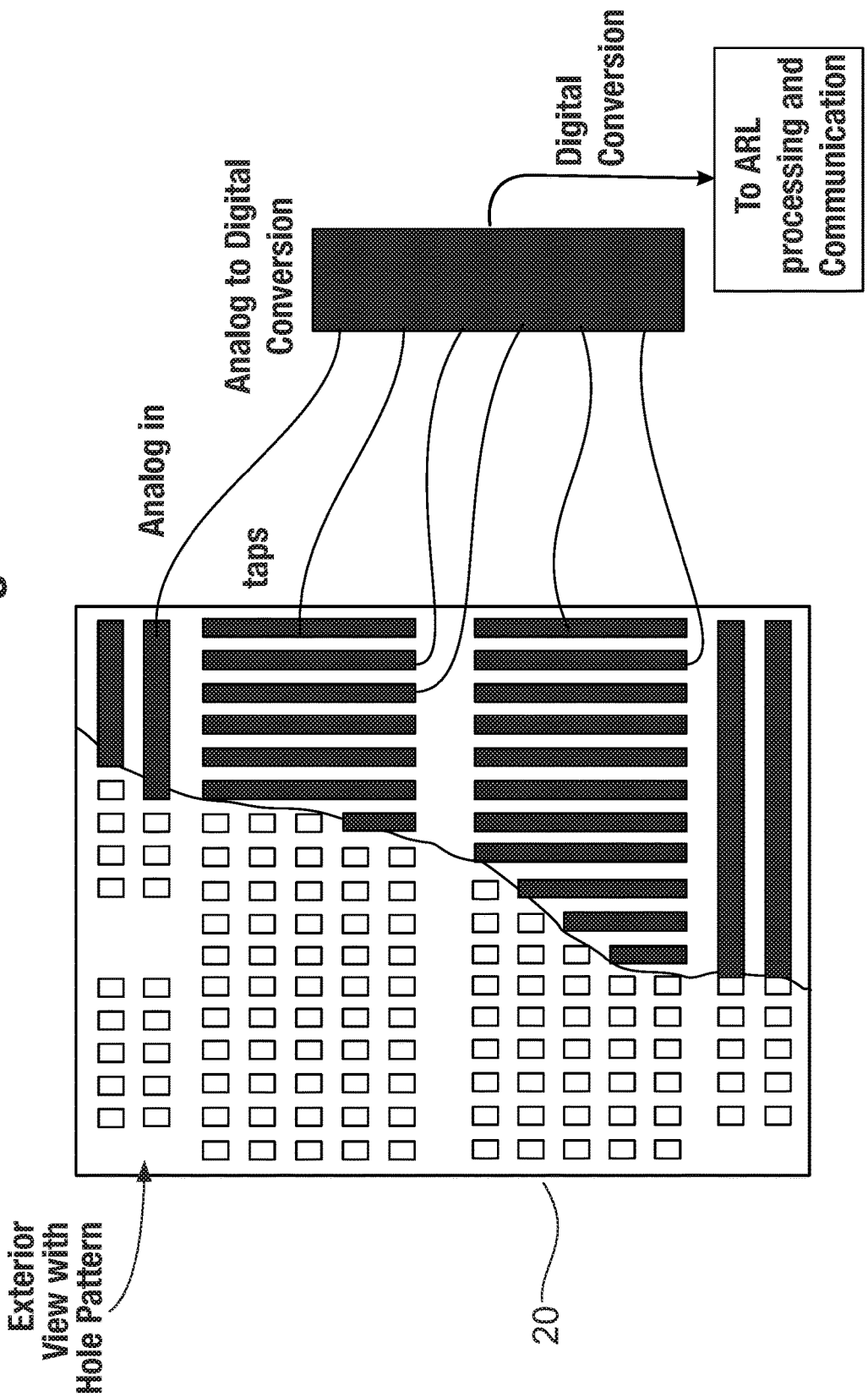
FIG. 2 shows a cut-away view of an Automated Remote Learning Breadboard that may be used with one aspect of the current disclosure.

In one embodiment, workstation 6 may include a modified breadboard, such as an Automated Remote Learning ("ARL") Breadboard. A typical breadboard would not have taps for voltage measurements, whereas an ARL Breadboard would be voltage measurement capable, as well as include analog and digital capabilities. As shown by FIG. 2, an ARL Breadboard 20 may be incorporated into workstation 6, not shown, ARL breadboard 20 may have Analog In input capabilities as well as Digital Out to other ARL processing and communication facilities, as known to those of skill in the art. Further, device 2 may include, in addition to breadboard 20, additional equipment 29 such as an Analog Discovery 2, available from Digi-Key Electronics, which is a USB oscilloscope and multi-function instrument that allows users to measure, visualize, generate, record, and control mixed-signal circuits of all kinds as well as work with analog and digital circuits in virtually any environment.

Example. Level Detector. In one embodiment, a distance learning experience may be employed to educate students regarding circuit schematics and physical rendering. For instance, a distance learning event may be designed around teaching a student(s) how to construct an analog circuit. For instance, the learning experience may be to energize a relay automatically with a decrease in light level as seen by a photo resistor or manually energize or de-energize the relay through start/stop buttons. The sensitivity of the level detection can be adjusted with a 10 k trim pot.

Figure 3:
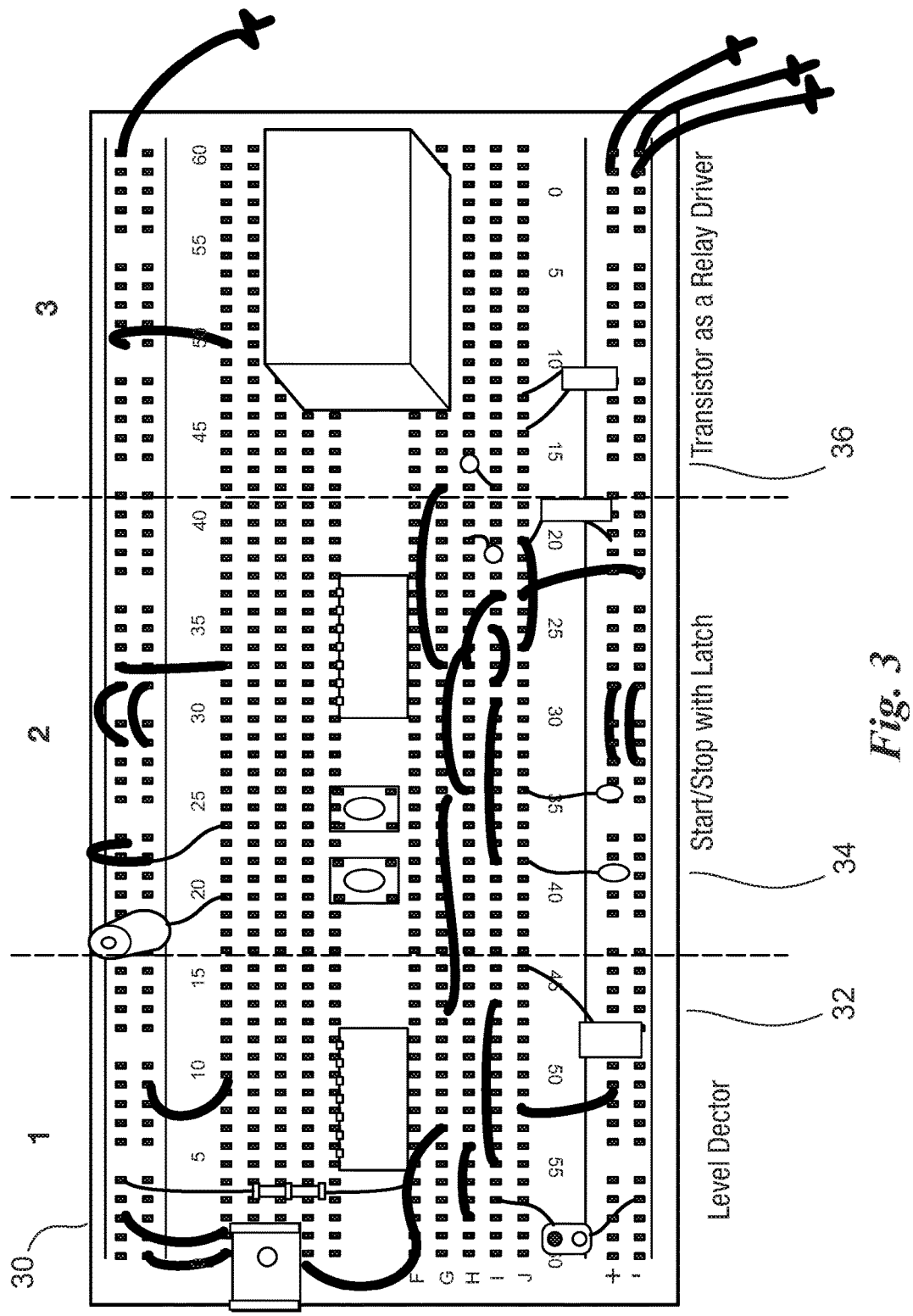
FIG. 3 illustrates a physical rendering of one workstation view of the current disclosure.
Figure 4:
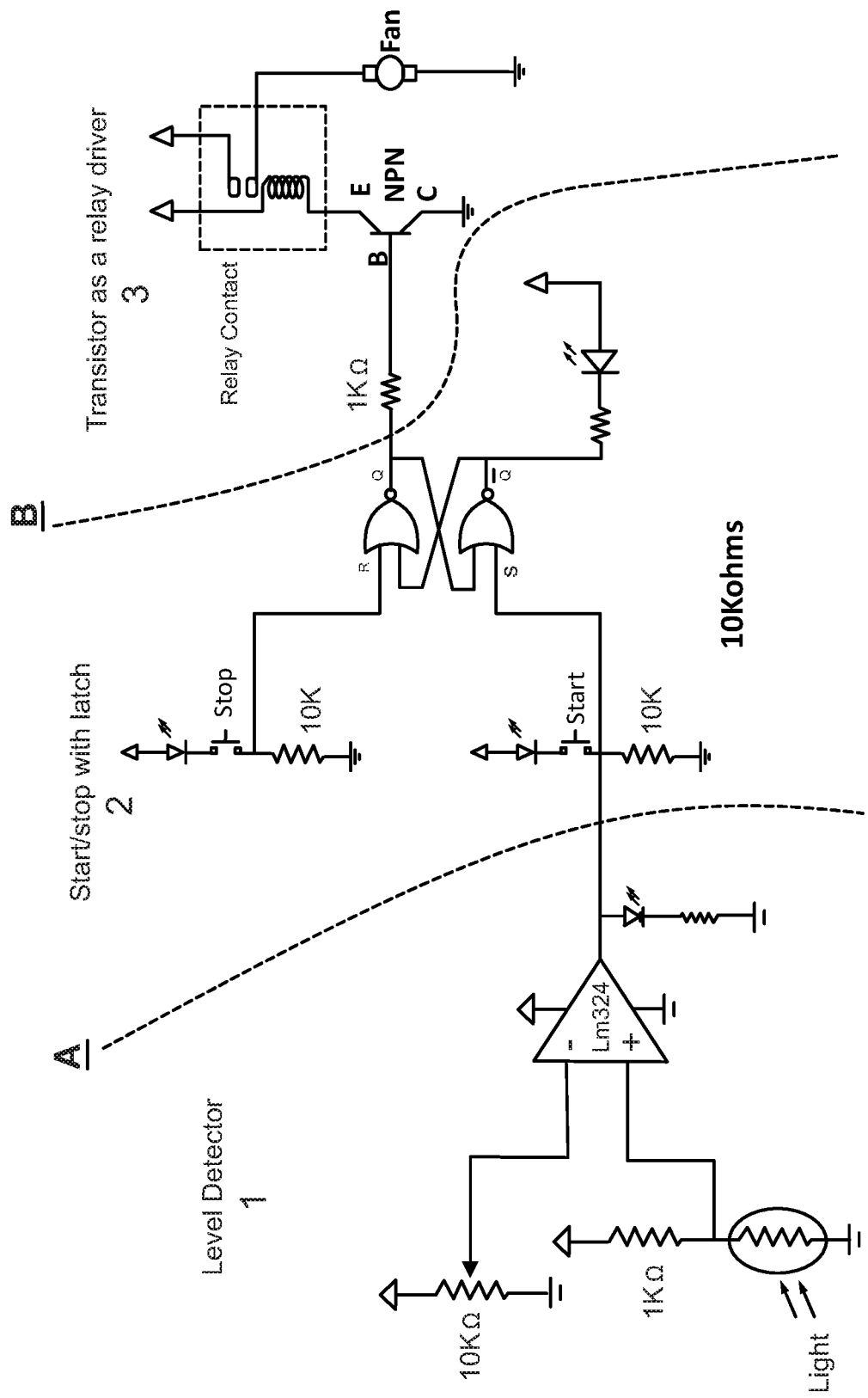
FIG. 4 shows a schematic view of the physical rendering of FIG. 3.

FIG. 3 illustrates a physical rendering of one potential embodiment of an ARL breadboard 30 that may be used with the current disclosure. ARL breadboard 30 may include level detector 32, start/stop function with latch 34, and transistor as a relay drive 36. FIG. 4 shows a schematic view of the physical rendering of FIG. 3.

Figure 5:
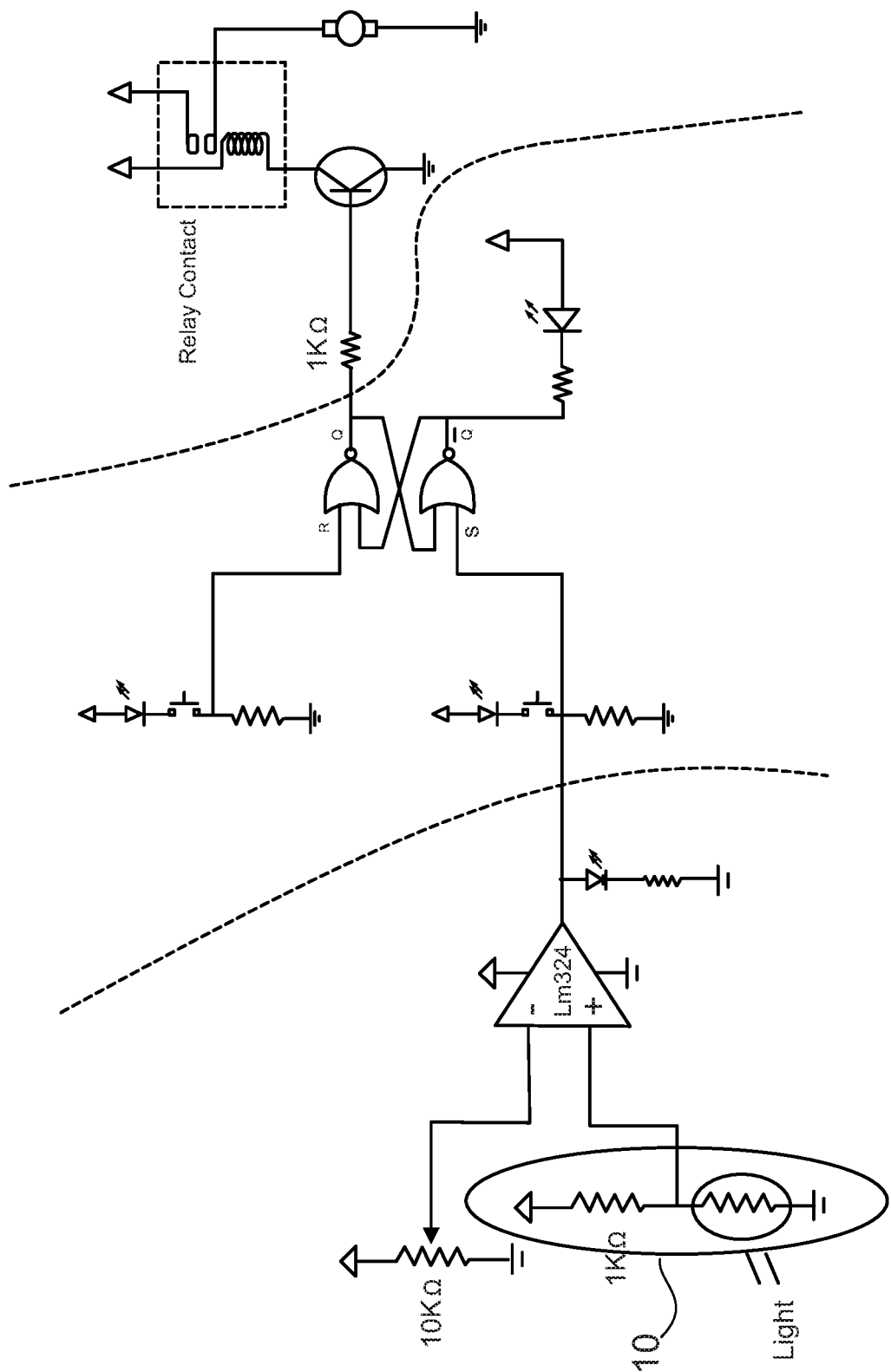
FIG. 5 shows the first step of a distance learning experience with the highlighted region representing work to be performed in later steps.
Figure 6:
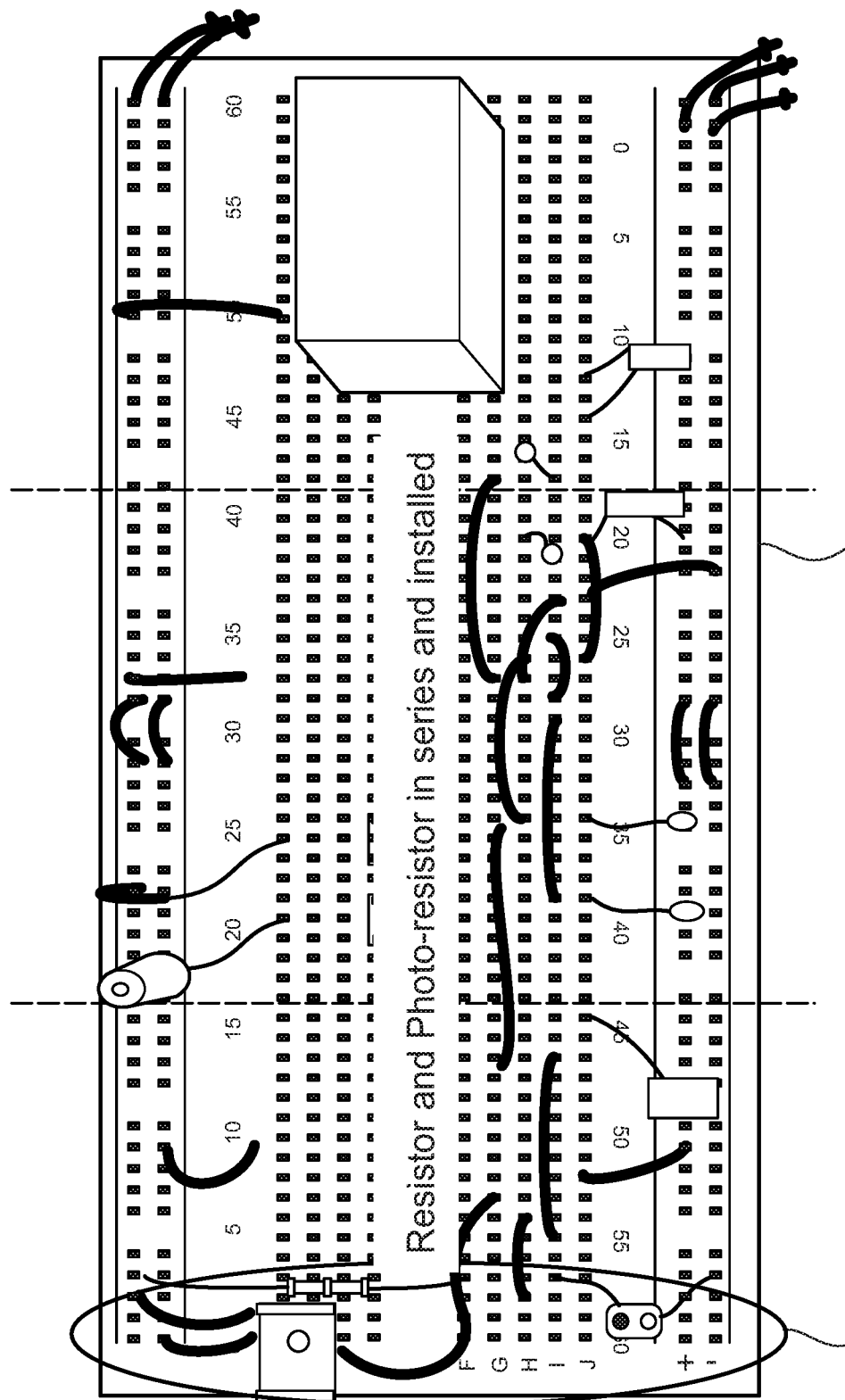
FIG. 6 shows a physical rendering of FIG. 5.
Figure 7:
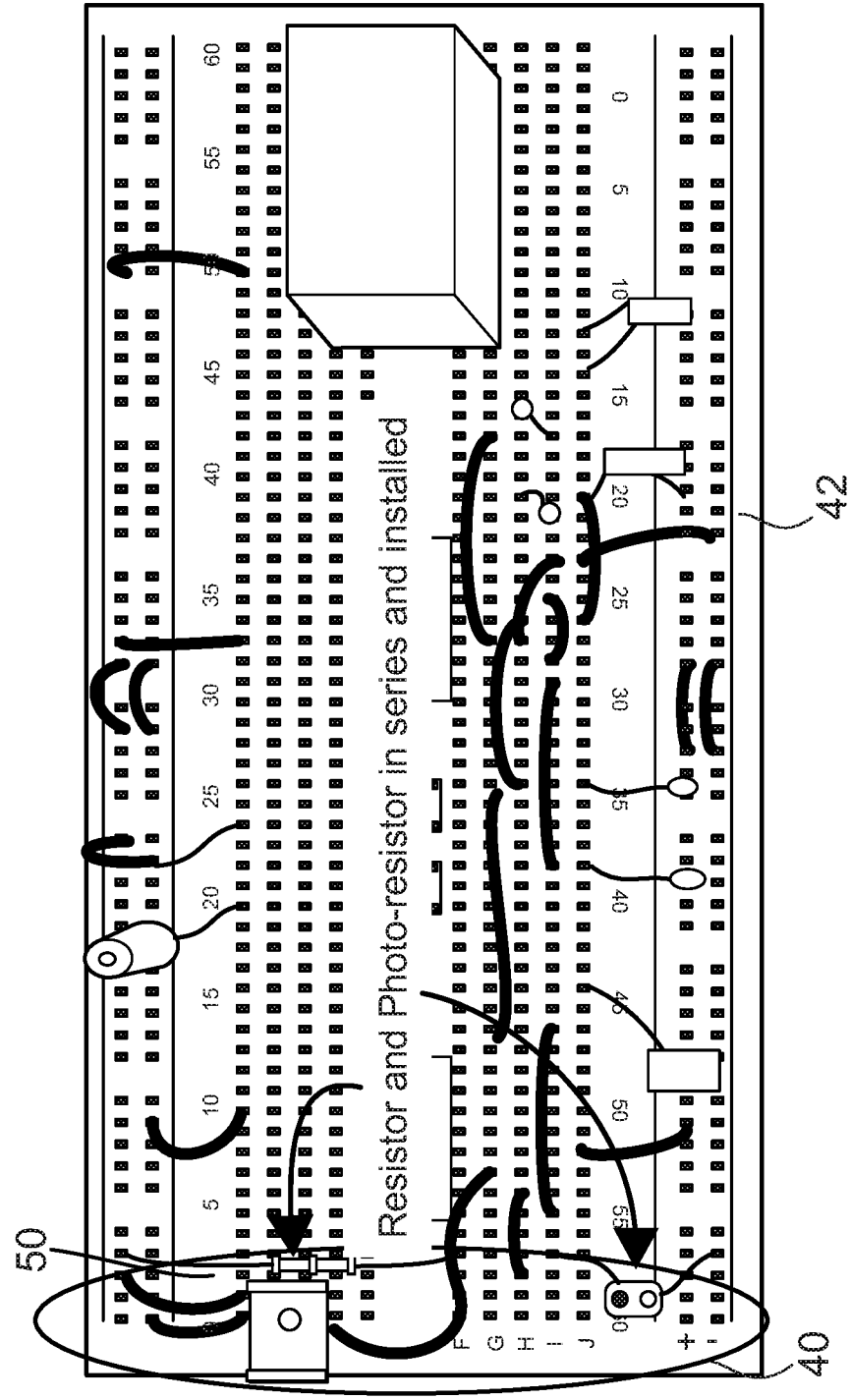
FIG. 7 shows one embodiment of an indicator used to indicate a portion of a breadboard in order to draw a student's attention to this area.

One embodiment of a distance learning event could teach a component/subsystem type of assembly, moving from left to right on FIGS. 3 and 4, with the lines A and B on FIG. 4 denoting the division of labor. Foremost, a student would be directed to place a resistor and photo-resistor. FIG. 5 at circle 40 shows the first step of this work process with the highlighted region 42 representing work to be performed in later stages. FIG. 6 shows a physical rendering of FIG. 5. FIG. 7 shows indicator location 50, which would be produced by indicator 12, not shown, used to indicate a location or position on breadboard 30 in order to draw the student's attention to this area.

Figure 8:
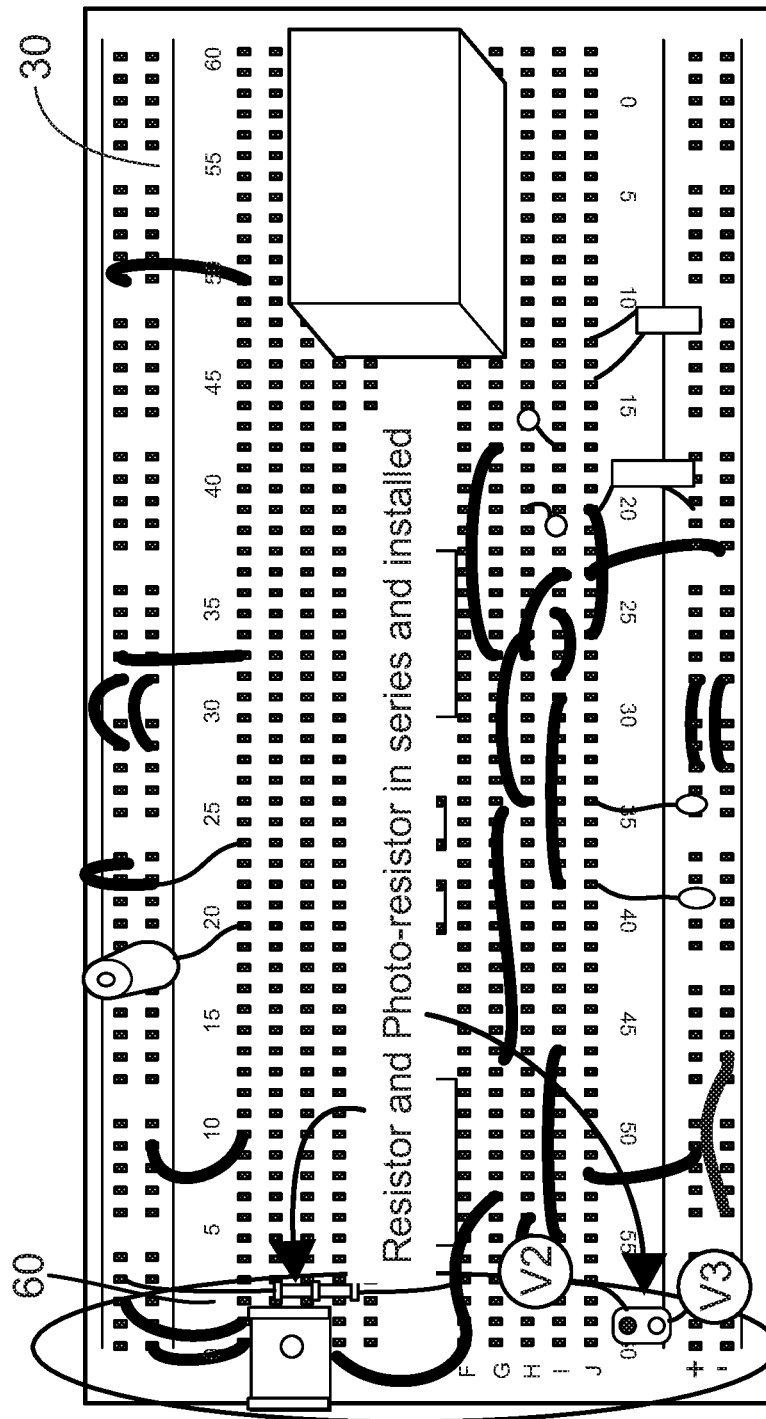
FIG. 8 shows voltage measurements taken from various locations on an ARL breadboard of the current disclosure.

As students learn to place components on a breadboard, mistakes are common. However, with the assistance of indicator location 50, which in one embodiment, may be a laser dot produced by a laser pointer such as indicator 12, which may also be accompanied by voice and/or video communication, the instructor may use indicator location 50 to assist the student in properly placing items on the breadboard, see FIG. 7 showing indicator location 50 used to indicate a portion of ARL breadboard 30. Use of ARL breadboard 30 allows the instructor to see, literally as well as via indicia from the ARL breadboard, and to direct student attention via indicator location 50 as well as voice and/or video communication, to areas of interest on ARL Breadboard 30. For instance, voltage measurements provided from ARL breadboard 30, which are transmitted to the instructor via the ARL device, will be seen by the instructor. The instructor may use this information to troubleshoot the student's assembly on ARL Breadboard 30 and to advise the student regarding modifying or changing same from a distance. For example, as shown by FIG. 8, voltage measurements 60, 62, and 64 from various locales on ARL breadboard 30 may be initiated and transmitted to the instructor. Voltage measurements 60, 62, and 64, once transmitted to the instructor, may be illustrated as an overlay or in the margins of a view of the student's ARL breadboard 30 seen by the instructor. These voltage measurements provide the instructor with means to analyze the student's circuit. This enables the instructor to understand what the student has constructed and provide correction of same, if necessary.

As explained above, the previous example depicted a single step. Another learning experience may have 2, 3, 4, or more, subsystems, all of which may be broken down into directable and testable multi-step learning experiences. Indeed, the previous example may be leveraged to provide Automated Remote Learning at a distance for the entire circuit during a lab event. Visual inspection and analysis of voltage measurements from the student's ARL breadboard 30 occurs throughout the entire circuit from input to output—this allows for teaching as well as troubleshooting problem areas.

Figure 9:
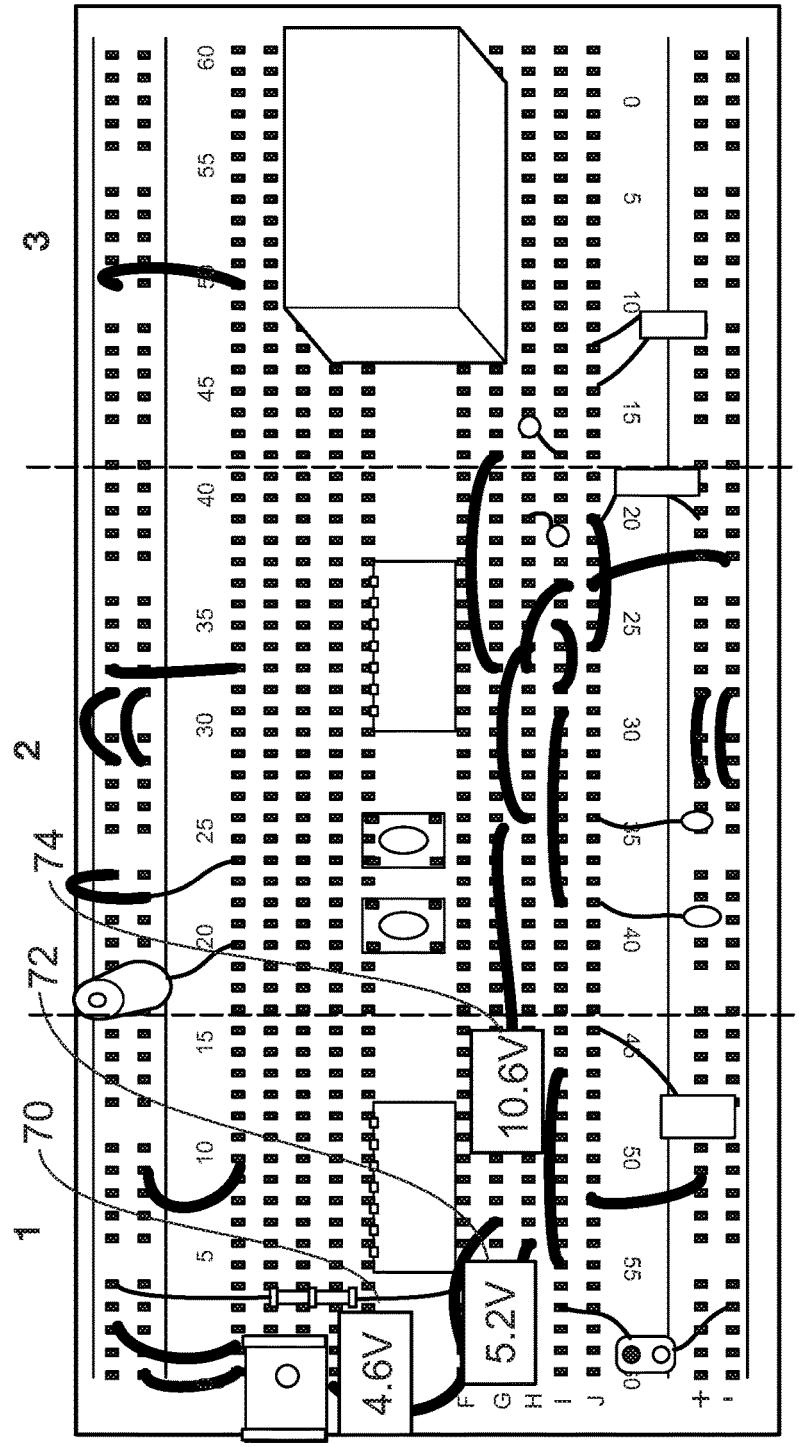
FIG. 9 shows a physical rendering of a breadboard of the current disclosure providing voltage measurements.

Example. Troubleshooting. Referring to FIG. 9, example voltages 70, 72, and 74 are generated via ARL Breadboard 30. In a proper student set-up, the voltages may read, for purposes of example only and not intended to be limiting, 4.6 V for 70, 5.2 V for 72, and 10.6 V for 74. However, if element 74 read 0.8V instead of 10.6 V, this information would alert the instructor that improper operation is occurring. This could be due to several factors, such as faulty construction, improper power, damaged IC, etc. Via visual inspection, voltage information received, and via use of indicator location 50 vis-à-vis the student's ARL breadboard 30, the instructor may instruct the student to take corrective steps on the ARL breadboard 30. During these steps of troubleshooting instruction the student would be engaged via the remote instructor in looking at inputs with functional knowledge of what the output should be for their circuit. During this process the student would find the problem in the circuit. Indeed, one important aspect of the current disclosure is that in this new method of remote learning, the array of voltage taps would provide the instructor more information quicker than in a normal or local laboratory setting.

Figure 10:
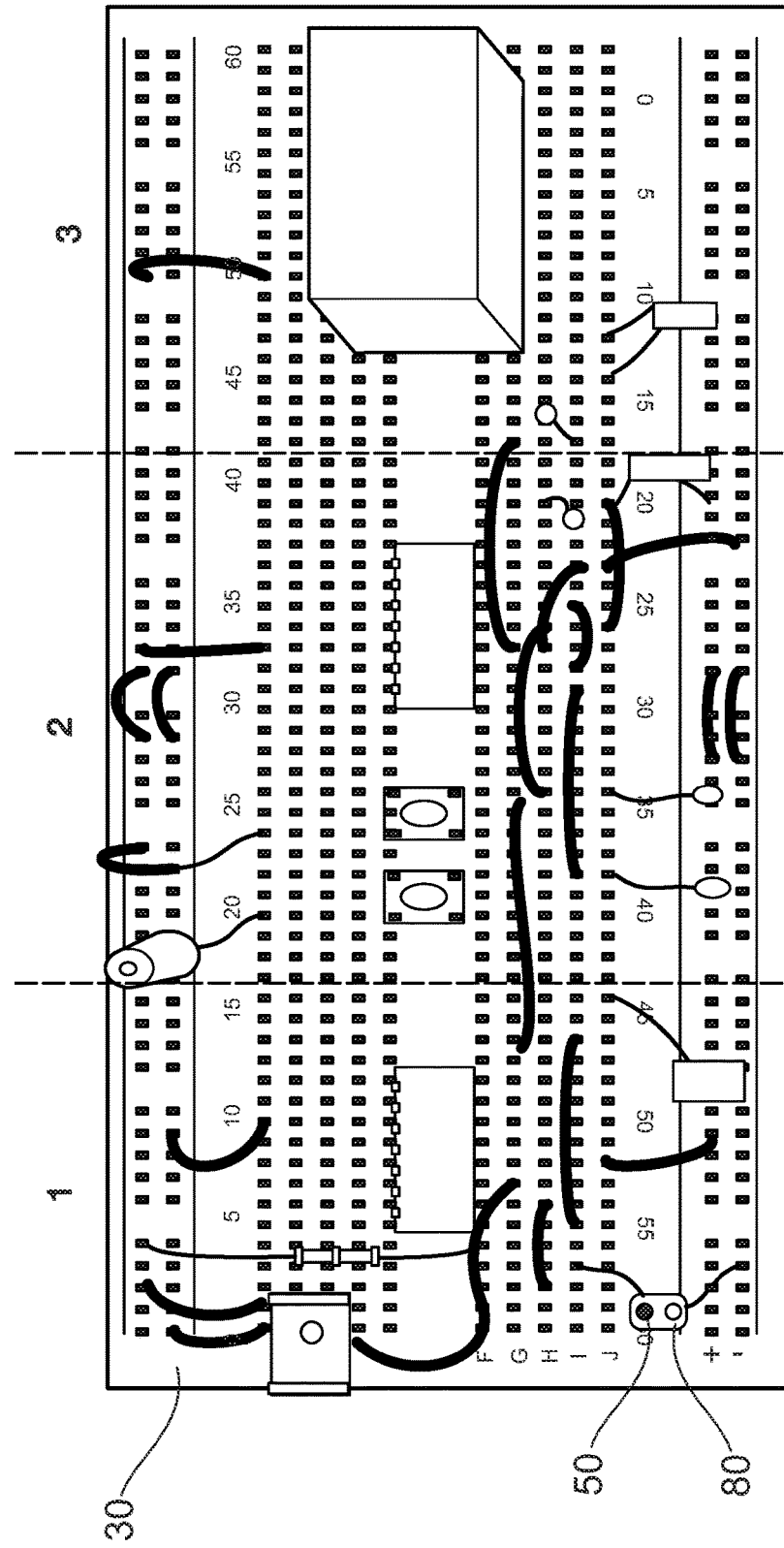
FIG. 10 illustrates a physical rendering of an ARL breadboard with an indicator location pointing to a photo resistor.

Example. Modification of circuit. FIG. 10 illustrates a physical rendering of ARL breadboard 30 with indicator location 50 pointing to a photo resistor 80. Here, the remotely located instructor may inform the student to replace photo resistor 80 with a resistive force sensor, not shown. The student would then test the modified sensor using local measuring equipment, not shown, to measure resistance in the modified circuit. The instructor would be able to assist as needed via indicator location 50 or via video and/or audio. Characteristic response curves of photo resistors and resistive force sensors would be available to the remotely located student and referred to by the remote instructor. As the student studies the circuit and modification, the instructor could assess through a rubric or offer hints as their pedagogy allows.

Thus, as described supra, the current disclosure allows for two way interaction by, for purposes of example only and not intended to be limiting, pointing a laser pointer, or other indicator, at different parts of workstation, such as a breadboard and circuit, while advising the student though voice and/or video communication. This may enable several students spread out in remote areas to actively participate in a laboratory learning environment with a central instructor, located at a distance from the students, via this effective and efficient new way to aid in the building of electronic circuits.

One problem the current disclosure addresses is best summarized by the tendency of the student to shift accountability from themselves to their surroundings for a malfunction in their circuit. When the instructor is present, any touching or manipulating of the student's circuit can be morphed into the words "it was working before you messed with it." This is overcome by the current disclosure, which circumvents the "if you touch it then you own it" defense of students creating non-functional experimental setups. Thus, the current disclosure, as a precautionary mantra, only points and guides but does not to physically interact with the circuit and board to an extent sufficient to change the configuration of same. The current disclosure places the instructor anywhere except near the circuit and board, thus eliminating accountability shifting.

An added benefit of this invention will be the omnipresence gatherings of information on the individual, group or effectiveness during the procedural steps are seen as quantitated measurements acting as a function of time. In these models a host of known variables and yet to be determined variables can undergo the scrutiny of causality. Furthermore when the physiological and other factors are quantified and modeled the student's performance can be better understood thus moving from the antidotal realm to the hard science of study.

This invention also provides a benefit that addresses the problem of remotely installing a "bug" or fault. These "bugs" could be communicated with the five senses such as the sound of a relay "clicking" on and off or the smell of an overheated resistor. A better teaching of troubleshooting occurs when the addition of "bugs" into the circuit on the breadboard at seemingly random moments. Through the distance learning method an instructor will be able to add "bugs" into the circuit and will be remotely installed appearing as an random event. For example, in the same proximity as the analog taps on the bread board, transistor switches may be placed so as to introduce "bugs." For example, the note between a photo resistor and fixed resistor may be grounded remotely via the transistor (acting as a switch) via GPIO used by the remote instructor. This example may be further extended not only to grounding but also biasing. A yet further example would be to ground input pings of an onboard ICS. A further example would be to pull output pins of onboard ICS via transistor using GPIO under the control of the remote instructor. Another example could be to incite a short circuit appearing as a low resistance path between analog tap locations. This example would be effective to provide a student with the experience of locating a shorted transistor or as a push-button malfunction.

Figure 11:
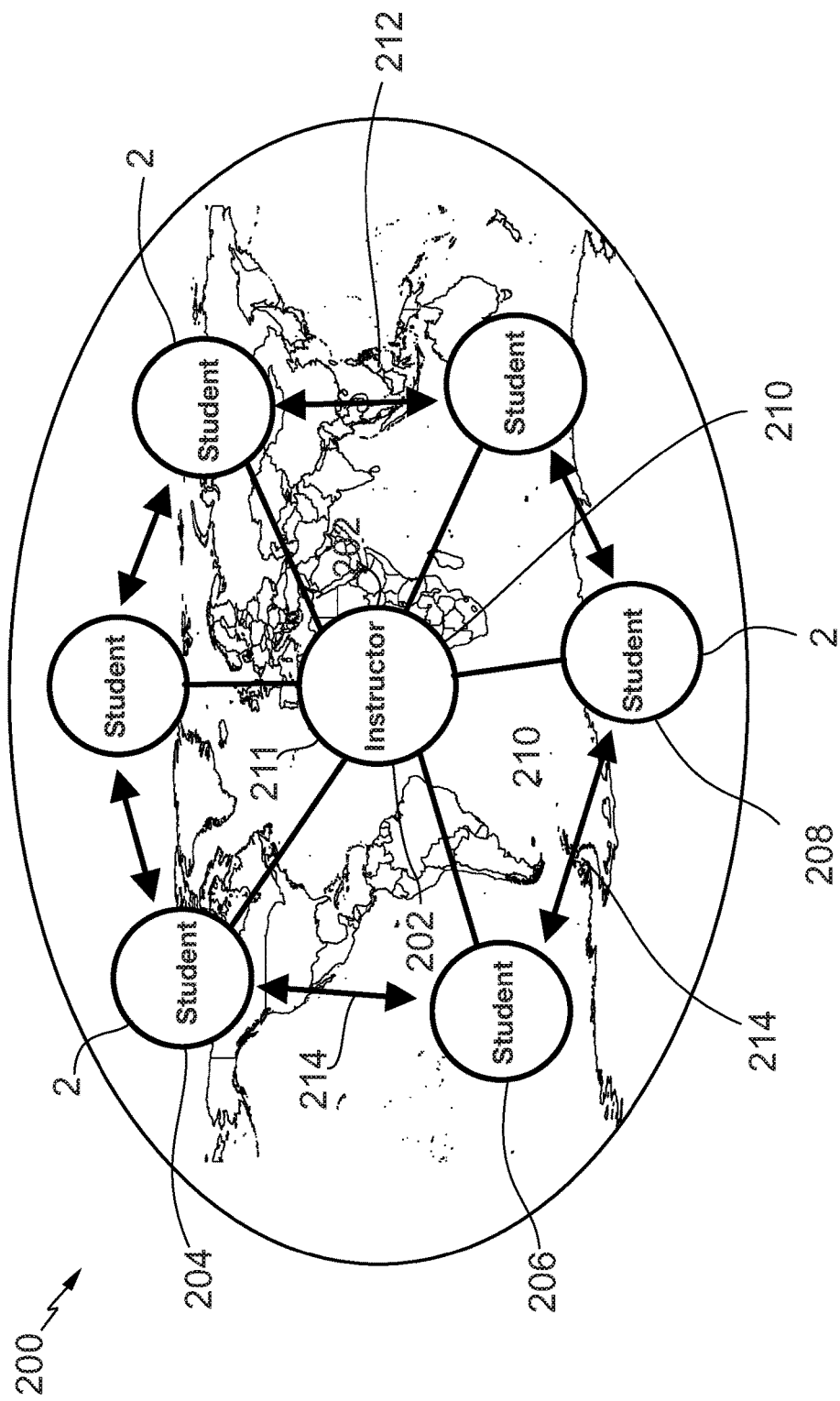
FIG. 11 shows a topographical view of one embodiment of the current disclosure.

FIG. 11 shows one possible educational system setup 200 of the current disclosure. In this embodiment, instructor 202 could be considered to reside in a "spiderweb" network connected to students in disparate geographic locations attending a class via each interacting with an automated remote learning device 2. For instance, student 204 may be in North America while student 206 is on an island in the Pacific Ocean while student 208 may be at a research facility in the Antarctic. Instructor 202 may reside in a control room 210 that is connected 211 to each student in the class via their respective automated remote learning device 2 as disclosed herein.

In a further embodiment, automated remote learning devices 2 may form network 212 by allowing for two-way communication 214 between devices 2. (Additionally, students may be allowed to communicate with one another over network 212 or another network established amongst units 2.) By allowing devices 2 to form a network 212, a rudimentary neural network may be formed amongst units 2 in use within a class of students. Further, communication platform 16 may contain a processor 21 that may use software 23 to evaluate a student's use of device 2. In this way, devices 2 could have built in "assistance" for students based on a history of use across the network, either via the current class experience or previous ones. This would enable students to learn from past users of a device 2 via software 23 interacting with the student via communication platform 16 in the form of a helpful hints data file, videos, etc., that a student might access if they encountered an issue or simply wanted to learn more about device 2. In addition, communication platform 16 may provide video, audio, sensory or other notifiers to students if a project is wrong, such as, for purposes of example only, a red light, a buzzer, flashing light, or burning smell if a circuit is assembled incorrectly. Other indicators, such as a green light, ding, or other means could be used to signify success.

Figure 12:
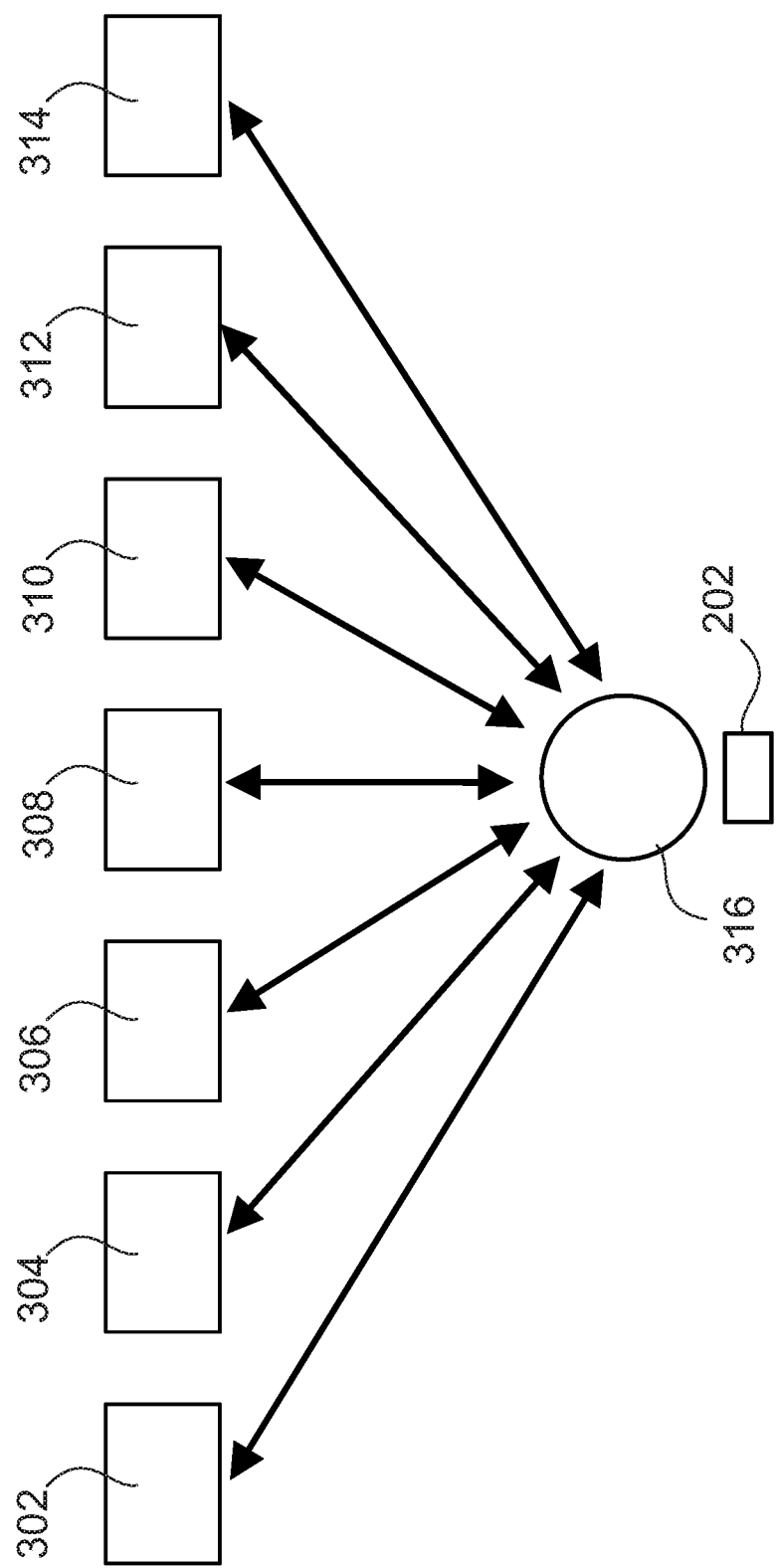
FIG. 12 shows one embodiment of a control room that may be employed with a teaching method of the current disclosure.

Control room 300, see FIG. 12, may include instructor 202 in a room with a series of video monitors 302, 304, 306, 308, 310, 312, 314 that show the feed from each student's automated remote learning device 2. Instructor 202 may employ a master control panel 316 to interact with the student via two way communication platforms 16, as described herein, via automated remote learning device 2, such as via using indicator 12 in the form of a laser pointer, in addition to employing two way communication platform 16 to discuss the work on workstation 6, to indicate areas of concern via a location indicator 50, or to show the student a video regarding the subject matter of the lesson.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A distance learning device comprising:
   a containment shell;
   a workstation;
   a two-way communication system;
   a visual analyzer; and
   a remote controlled indicator that points and interacts, via a laser indicator, at various areas of a surface of the workstation, wherein direction of the remote controlled indicator occurs at a location different than where the distance learning device is located; and
   wherein the workstation comprises an interactive electronic laboratory system within the containment shell.

2. The distance learning device of claim 1 further comprising an articulation arm.

3. The distance learning device of claim 1, wherein the workstation comprises laboratory equipment.

4. The distance learning device of claim 3, wherein the laboratory equipment comprises an electronic breadboard.

5. The distance learning device of claim 1, wherein the device is configured to communicate with other distance learning devices.

6. The distance learning device of claim 1, wherein the device is configured to provide two-way video and audio communication.

7. The distance learning device of claim 1, wherein the visual analyzer comprises an infrared camera.

8. The distance learning device of claim 1, wherein remote controlled interaction with the workstation is achieved without requiring physical proximity to the device.

9. A system for conducting distance learning laboratories including:

a portable distance learning device, wherein the device contains at least two-way audio and visual communication;

a workstation on the device comprising a remote controlled indicator that points at and interacts with, via a laser indicator, various areas of a surface of the portable learning device wherein direction of the remote controlled indicator occurs at a location different than where the distance learning device is located; and the portable distance learning device comprising a laboratory instruction module wherein the portable distance learning device comprises an electronic laboratory system incorporated completely within a containment shell of the portable distance learning device.

10. The system of claim 9 further comprising an articulation arm.

11. The system of claim 9, wherein the workstation comprises laboratory equipment.

12. The system of claim 11, wherein the laboratory equipment comprises an electronic breadboard.

13. The system of claim 9, wherein the portable distance learning device is configured to communicate with other portable distance learning devices.

14. The system of claim 9, wherein the portable distance learning device is configured to provide two-way video and audio communication.

15. The system of claim 9 further comprising an infrared camera.

16. The system of claim 9, wherein, wherein remote controlled interaction with the workstation is achieved without requiring physical proximity to the device.

* * * * *